Figure 1:
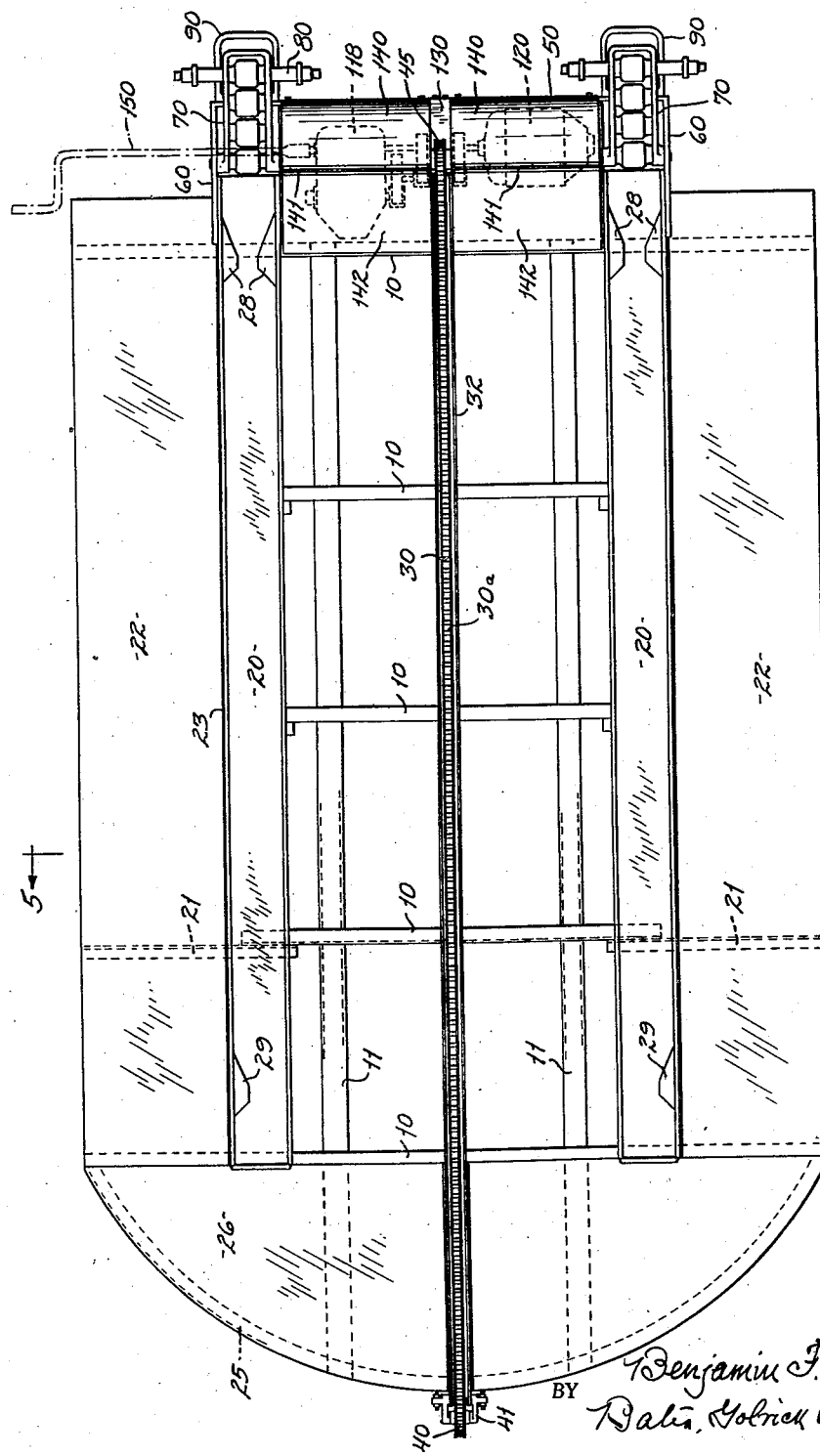

Aug. 16, 1938.   B. F. FITCH   2,127,058
FREIGHT TRANSFERRING APPARATUS
Filed June 28, 1937   4 Sheets-Sheet 1

INVENTOR.
Benjamin F. Fitch,
BY
ATTORNEYS

Aug. 16, 1938.    B. F. FITCH    2,127,058
FREIGHT TRANSFERRING APPARATUS
Filed June 28, 1937    4 Sheets-Sheet 3

INVENTOR.
Benjamin F. Fitch,
ATTORNEYS

Aug. 16, 1938.  B. F. FITCH  2,127,058

FREIGHT TRANSFERRING APPARATUS

Filed June 28, 1937  4 Sheets-Sheet 4

INVENTOR.
Benjamin F. Fitch,
BY Bates, Goldrick & Teare,
ATTORNEYS

Patented Aug. 16, 1938

2,127,058

UNITED STATES PATENT OFFICE

2,127,058

FREIGHT TRANSFERRING APPARATUS

Benjamin F. Fitch, Greenwich, Conn., assignor to Motor Terminals, Inc., Cleveland, Ohio, a corporation of Ohio Application June 28, 1937, Serial No. 150,679

31 Claims. (Cl. 214—38)

This invention relates to a highway vehicle adapted to transport a demountable freight container and provided with mechanism for moving such container on to and off of the vehicle.

The vehicle may be a trailer drawn by a tractor, or may be a unitary truck. The propelling mechanism comprises a looped chain and motor driven mechanism for moving the chain in one direction or the other, such chain being adapted for attachment by a push and pull bar to the demountable container. The vehicle is also provided with bridges at its rear end which are adapted to be coupled to a railway car or platform and not only locate the highway vehicle with reference to such railway car or platform, but provide supports for the container as it is moved across the bridges to or from the highway vehicle.

The invention is concerned with improvements in such a vehicle as above outlined, the objects of the improvement including a simplification of the propelling mechanism while increasing the strength and efficiency thereof to meet the exacting conditions of the transfer of heavy bodies to or from the vehicle.

Another object of the invention is to so devise the propelling mechanism that it may be mounted on a trailer having a rounded front end, thereby enabling closer coupling to the tractor, and a better distribution of weight on the vehicle. Another object is to provide a self-contained propelling mechanism carried by a supplemental interchangeable platform which may be readily mounted and clamped in place on existing trucks or trailers, as desired.

Another feature of the invention comprises so arranging the propelling mechanism that it may operate with great efficiency the transferring of the body to or from the vehicle, even though the vehicle is not strictly aligned with the cooperating platform or railway car.

Another feature of the invention is the provision of driving mechanism for the propelling chain in closed compartments protected from the weather or washing water, but readily accessible for greasing or repairing. In the same category is the provision of means for readily removing the motor and gear reduction unit for repairs or replacement.

Other features contributing to the efficiency of the invention will be apparent from the following detailed description of a preferred embodiment illustrated in the drawings. The essential novel features of the invention are summarized in the claims.

Figure 2:
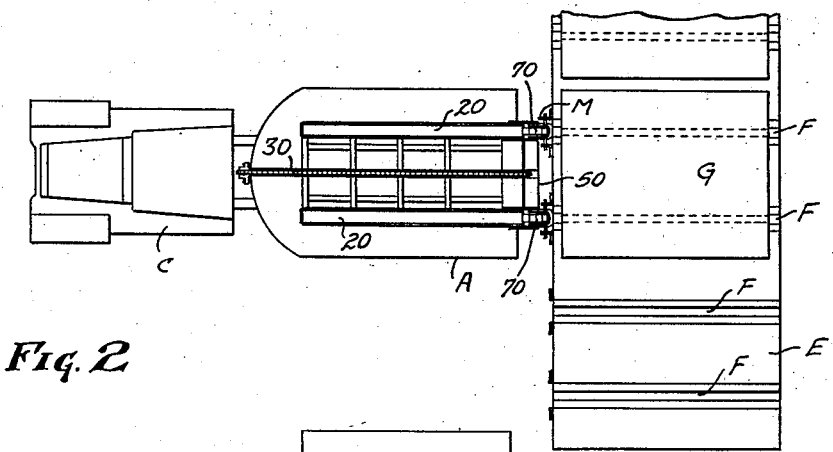
Figure 3:
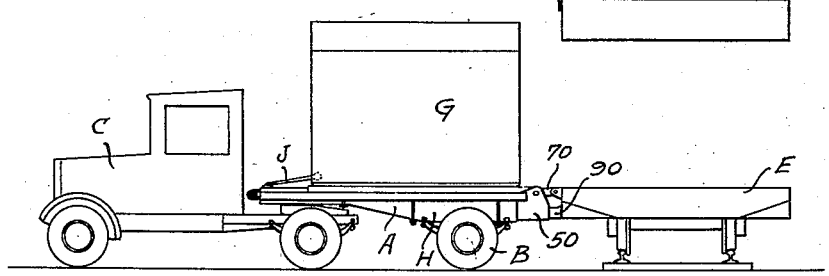
Figure 4:
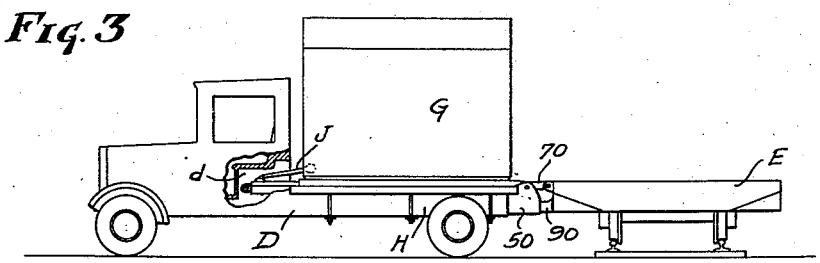
Figure 5:
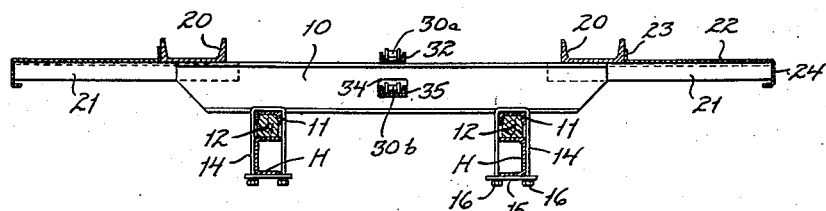
Figure 6:
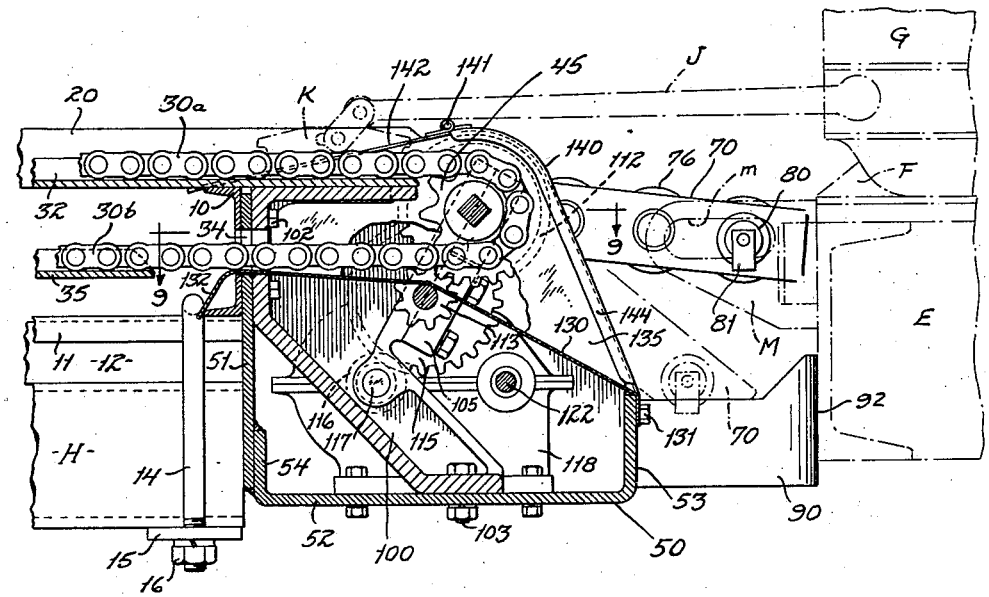
Figure 7:
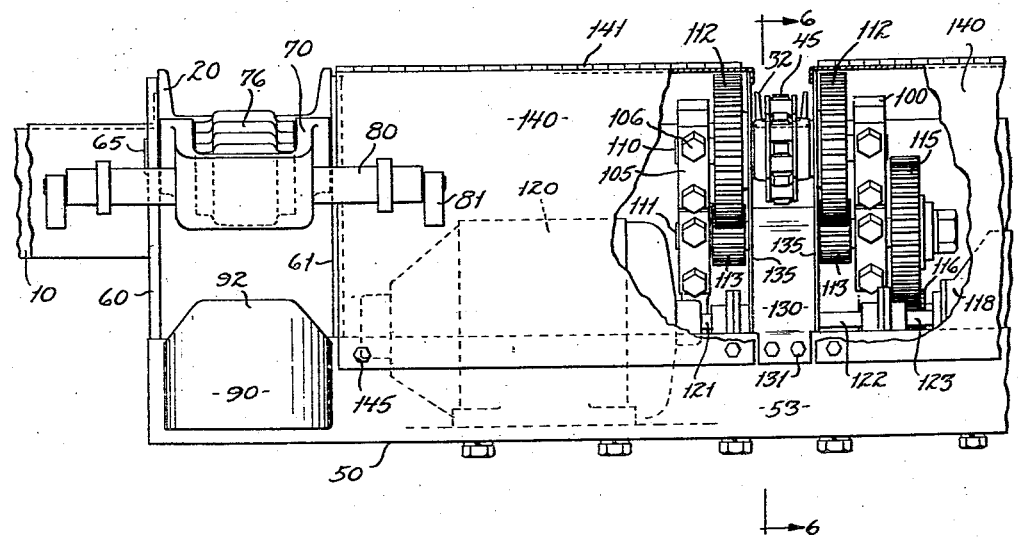
Figure 8:
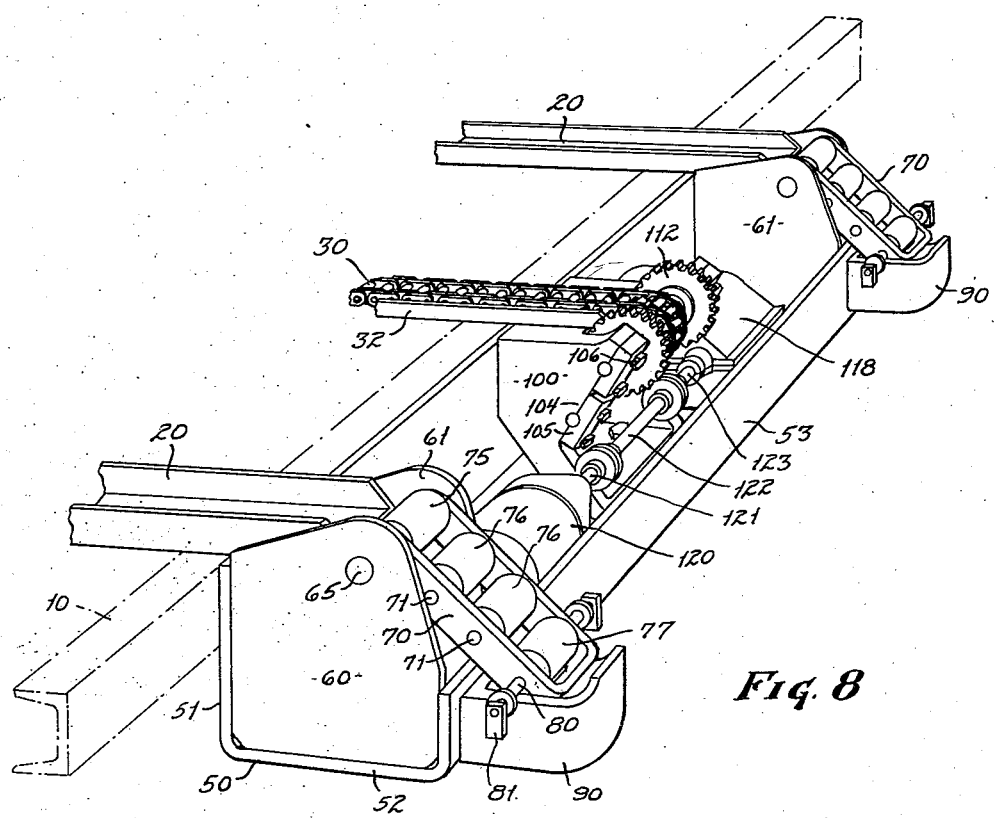
Figure 9:
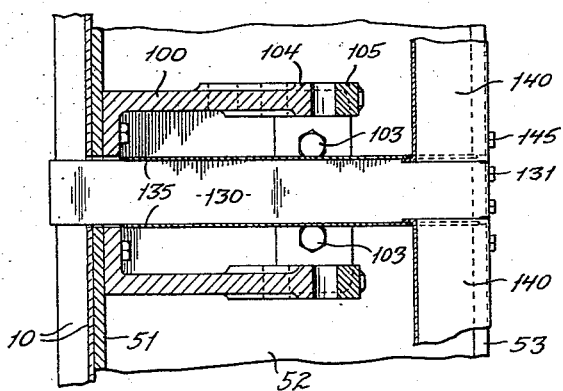

In the drawings, Fig. 1 is a plan of the equipped supplemental platform of this invention ready for mounting on a trailer or truck; Fig. 2 is a plan of the highway unit comprising a tractor and trailer, the latter shown as coupled with a railway flat car, carrying a demountable body; Fig. 3 is an elevation of the parts shown in Fig. 2, but with the container on the trailer; Fig. 4 is a view similar to Fig. 3, showing the vehicle in the form of a unitary truck, rather than a tractor and trailer, but carrying the same supplemental platform; Fig. 5 is a cross-section on line 5—5 of Fig. 1; Fig. 6 is a vertical section (on the line 6—6 on Fig. 7) on a larger scale than the preceding figures, of the mechanism at the rear end of the vehicle for operating the propelling chain, this view showing the bridges attached to the side of a railway car, and indicating in broken lines the container coupled with the chain. This also shows in broken lines the position of the bridges during travel of the vehicle; Fig. 7 is an end elevation of the vehicle platform partly broken away, showing one of the bridges in the attached position as in Fig. 6; Fig. 8 is a perspective at the rear end of the vehicle, illustrating the support for the bridges and chain propelling mechanism; Fig. 9 is a detail, being a section on the line 9—9 in Fig. 6.

In Figs. 2 and 3, A indicates the trailer shown as a semi-trailer supported by wheels B through intermediate springs and connected at the forward end by a suitable kingpin to the tractor C. In Fig. 4, D indicates a truck which is a substitute for the trailer A and tractor C. In each of these views E indicates a railway flat car which is equipped with pairs of positioning channels F extending crosswise and spaced apart in correspondence with longitudinal channels on the highway vehicle; G indicates a demountable container which is provided on its base with skid rails adapted to occupy channels F of the railway car or those of the highway vehicle.

Whether the highway vehicle is a tractor or a unitary truck, it has the usual longitudinal chassis sills in the form of inwardly facing channels shown at H in Figs. 3, 4 and 5. My invention provides a supplemental platform which is adapted to be mounted on such sills, and carries the guides for the container and the propelling mechanism about to be described. The supplemental platform has transverse bolsters 10, shown in Figs. 1 and 5, which are connected by downwardly facing longitudinal channels 11, spaced corresponding to the chassis sills H. Within these channels are longitudinal wooden beams 12. These wooden beams rest directly on the upper flanges of the chassis sills, and the entire platform is clamped to the chassis sills by U-shaped bolts 14, which extend over the platform channels 11 and downwardly on opposite sides of the chassis sills H. Their lower ends pass through plates 15 and receive nuts 16.

Supported on the upper ends of the transverse bolsters 10 are upwardly facing longitudinal channels 20 which are spaced in correspondence with the channels F of the railway car or platform, and are adapted to receive the skid rails of the container G. These channels 20 preferably slightly overhang the ends of the bolsters 10 as shown in Fig. 5. Beneath the channels 20 are occasional cantilever bars 21, secured to the bolsters and extending outwardly and supporting longitudinal plates 22 which are flanged upwardly at their inner edges at 23 to abut the outer flanges of the channels 20 and flange downwardly at their outer edges 24 across and beneath the ends of the cantilever bars 21. At the front end of the platform is a curved inwardly facing channel beam 25 which is secured to the longitudinal beams 11 and bounds the forward end of the platform. A segment-shaped top plate 26 acts as a gusset for this boundry beam.

The transverse bolsters, their sill channels, the guide channels, the transverse extension bars, the curved front beam and the top plates are all of steel, rigidly secured together preferably by welding. This makes a light, and at the same time rigid supplemental platform readily mountable on the chassis sills of trucks and tractors of standard construction.

Carried by the supplemental platform is an endless propelling chain 30 looped in a vertical plane and extending longitudinally in the central region of the platform for substantially the full length thereof. The upper reach of this chain, designated 30a, lies in an upwardly facing channel beam 32 resting on, and secured to the top flanges of the bolsters 10. The lower reach of the chain, designated 30b, extends through openings 34 in the bolsters and lies in an upwardly facing channel 35 extending longitudinally through these openings.

The forward end of the chain 30 loops about a sprocket wheel 40 carried by a bracket 41 secured to the web of the curved inwardly facing channel beam 25. At its rear end the chain passes around a driving sprocket 45 positioned at the rear end of the platform and driven by mechanism hereinafter described.

The single central chain may be connected in any desired region with the container to be moved by a push-and-pull bar shown in broken lines at J in Fig. 6 and connected at one end to the container and at the other by toothed shoes K with the chain as described and claimed in my co-pending application, Serial No. 45,616, filed October 18th, 1935.

The provision of a single centrally located chain, in place of two chains adjacent the guide channels 20, has several distinct advantages in addition to that of simplicity and reduced cost. Thus by means of the central chain, I am able to have the chain extend the full length of the vehicle and still employ the rounded front end which enables closer coupling of a trailer to a tractor as shown in Figs. 2 and 3, or the platform on a unitary truck as shown in Fig. 4, where the forward end of the platform extends into a rearwardly open pocket d beneath the seat of the truck. This closer hook-up results in a larger percentage of load weight being borne by the rear axle of the tractor or the front axle of the unitary truck and assists in both tractive and braking resources of the driving vehicle.

With a single chain, the sprocket and gear assembly at the rear of the truck to be described, may be readily bolted or otherwise secured to the platform frame, and, similarly, the attachment is simple for the front sprocket described.

Another advantage of the central single chain is that when there is a slight misalignment of the vehicle channels 20 with those of the platform or car shown at F, Fig. 2, no strain results, as the diagonal thrust is eliminated; whereas with two chains, a misalignment throws the entire push or pull stress on one chain and tends to skew the container, thereby increasing the side wall friction and imposing greater tractive effort than would normally occur.

The channels 20 are preferably provided with projections 28 and 29 on their inner faces, which coact with the skid rails of a demountable body, being moved to or from the platform to center the rails with reference to the channel, and at the same time allow the ready travel of the rails in the channels if the highway vehicle is not strictly aligned with reference to the guides of the railway car or platform.

I will now describe the construction at the rear end of the platform which carries the bridges and the driving mechanism for the rear sprocket 45, and which is best shown in Figs. 1, 6, 7 and 8.

Secured to the rear bolster 10 of the supplemental frame is a trough-like box 50 extending across the platform and comprising a vertical front plate 51, a horizontal bottom plate 52, and a vertical rear flange 53. The rear flange may be integral with the bottom plate, while the front plate may be secured by welding to an up-turned flange 54 of the bottom plate, as illustrated in Fig. 6. The front plate 51 may be riveted to the bolster, but is preferably bolted by bolts, not shown, to allow ready removal.

The trough 50 is closed at its ends by vertical plates 60 welded or otherwise secured to the trough. A short distance from these plates located intermediately, are parallel plates 61. The plates 60 and 61 are so spaced that they lie snugly against the outer faces of the flanges of the channels 20. The plates 60 and 61 form the supports for the bridges. These bridges are made of U-shaped castings 70, the free ends of which are pivotally mounted on cross-pins 65 carried by the plates 60 and 61.

Between the side arms of the bridges 70 are free rollers. One of these rollers, 75, is mounted on the pivot pin 65. I have shown two intermediate rollers 76 mounted on pins 71 carried by the bridge side arms. The rearmost roller 77 in this bridge is journalled on a cross-shaft 80, which projects beyond the sides of the bridge and furnishes the means for attaching the bridge to the railway car or platform.

The attaching device on the car or platform may be of the form shown and claimed in my pending application, Serial No. 32,131, filed July 18th, 1935, which is briefly illustrated in Fig. 6 and comprises foldable wings M carried by the side of the car and adapted to be swung out at right angles thereto. These wings have slots M in which the projecting ends of the cross shaft 80 of the bridge may ride. That shaft carries loose dogs 81 at its ends which normally depend by gravity, but when turned up manually into horizontal position allow the wing M to be swung over the end of the shaft and thereafter be retained by dropping of the dog, as indicated in Fig. 6.

To support the free ends of the bridges during travel of the highway vehicle as well as to protect them, I provide the bumper construction illustrated at 90. This construction comprises a suitable casting in the form of an upwardly open box, the forward wall of which is welded to the vertical flange 53 of the trough 50. Normally during travel, the cross-shafts 80 of the bridges rest on the side walls of the bumper boxes as shown in Fig. 8. The rear walls 92 of the bumper boxes extend upwardly and thus protect the supported bridges from injury.

In positioning the truck, it is backed against the side of the platform or car until the bumpers 90 abut such side. The rearmost faces of the bumpers being preferably flattened to a vertical plane distribute the impact resulting from such engagement.

It will be seen that the bumper not only supports the bridge in travel and protects it against injury when the truck backs into attaching position, but properly positions the vehicle with reference to the car, so that when the bumper engages the side sill of the car as shown in Fig. 6, the bridge is positioned for raising and attachment to the car. The described arrangement, carrying pivot of the bridges some distance forward of the rear end of the gear and bridge box, enables comparatively long bridges to be employed, associated with comparatively short bumpers supported by the end wall of the box. By lengthening the bridge I provide for a greater range of elevation between the highway truck and railway car or platform, and supply an easier grade between them. The comparatively short bumper may really be a casting, is not liable to be displaced, and is effective to support the bridge and position the vehicle.

The bumper support per se is not claimed herein, but in the copending application of R. A. Norbom, Serial No. 87,649, filed June 27th, 1936, and assigned to my assignee. It is here claimed in combination with my novel supporting box.

Centrally located in the trough-like box 50 is a bracket 100 which carries the driving sprocket 45 and its gearing. This bracket is U-shaped in horizontal section as shown in Figs. 8 and 9, as well as in some of its vertical or diagonal sections. It is removably secured to the trough 50 by horizontal bolts 102 and vertical bolts 103 as indicated in Fig. 6. At its rear face, it is somewhat upright and is formed into pads 104 to which are bolted caps 105 by cap screws 106. This provides a bearing for the sprocket shaft 110 and the lay shaft 111.

The sprocket shaft 110 carries centrally the driving sprocket 45 and beyond the hub thereof two gears 112. These gears 112 mesh with pinions 113 on the lay shaft 111. This lay shaft carries, on the other side of one of the bearings, a gear 115 with which meshes the pinion 116 on the delivery shaft 117 of a suitable reducing gear unit housed in a casing 118 and located in the trough between the gearing described and the adjacent vertical plate 61.

The driving motor 120 is located in the trough 50 on the other side from the reduction gear. This motor has its armature shaft 121 connected by couplings and an intermediate shaft, all designated 122, to the driving shaft 123 of the reduction gearing. This reduction gearing may be of any suitable form operating to transmit the power of the shaft 123 at greatly reduced speed to the delivery shaft 117. Preferably, the reduction gearing comprises suitable train of spur gears which are all mounted within the casing 118.

Mounted beneath the rear portion of the lower reach 30 of the chain is a shield plate 130 secured at its rear end by cap screws 131 to the trough flange 53 and extending diagonally upwardly over the shaft 111, passing beneath the chain through the opening 34 it occupies to the front side of the rear bolster 10, where the plate is bent downwardly, as shown at 132, Fig. 6. The upper portion of this plate forms a chain guide while the lower portion acts as a watershed. At the edges of the plate 130 and secured to it, or if desired, integral with it, are vertical plates 135 which have their top portions shaped similarly to bridge supporting plates 61. The plates 61 and 135 divide the trough into two compartments on opposite sides of the open central space for the sprocket. Each of these two compartments is closed by a cover 140 which is connected by a hinge 141 to a fixed substantially horizontal plate 142 which extends rearwardly to the bolster channel 10, as shown in Fig. 1. The edges of the cover plates are flanged downwardly (144, Fig. 6) to overhang the edges of the plates 61 and 135.

The construction described provides a closed compartment for the motor and the adjacent part of the gearing, and a closed compartment for the reduction gearing and the rest of the main gearing. The covers are held closed by cap screws 145 passing into the trough flange 53. All these parts are therefore thoroughly protected from dirt or the weather, or the water used in washing the vehicle.

To provide for hand operation of the propelling mechanism in case electric current is not available, I furnish with the vehicle a removable hand crank, shown in broken lines at 150 in Fig. 1, this crank having a socket at its inner end adapted to drivingly register with the projecting end portion of reduction gear shaft 123, or with stud on one of the gears.

The motor may be supplied with current from an outside source or from a generator supplied by the power unit of the truck, as illustrated in my application Serial No. 39,725, for a Freight handling vehicle. A suitable control switch for the motor is installed in some convenient position for the operator, for instance on a flexible cable, enabling him to observe the travel of the body while he operates the switch.

While the entire highway vehicle with its platform may, of course, be built as a unit, one of the advantages of my platform construction is that it is adapted for mounting on standard vehicles without requiring a modification thereof, the stringers of the platform being spaced according to the accepted standard. By mounting the driving gear and bridge mechanism in the box unit described, it is practicable to keep extra units at various service stations ready for substitution, in case of a major accident. Minor repairs can readily be made by removing the different portions from the box and installing substitutes.

I claim:

1. The combination of a highway vehicle, a supplemental platform adapted to be mounted thereon, a longitudinal looped chain carried by the platform, guides on the platform for a demountable container, bridges carried by the platform at the rear end of the guides, and driving mechanism for the chain carried by the platform at its rear end between the bridges.

2. A supplemental platform adapted to be mounted on a highway vehicle and carrying longitudinal propelling mechanism, and a compartmented box carried by the platform at one end, a driving motor in one of the compartments, reduction gearing in another of the compartments, means connecting the motor with the reduction gearing and a driving connection between the reduction gearing and the longitudinal propelling mechanism.

3. A supplemental platform suitable for mounting on a highway vehicle, and having transverse bolsters in the form of structural shapes with openings through their webs, an upwardly facing longitudinal channel beam occupying said openings, another longitudinal channel beam carried on the tops of the bolsters, an endless propelling chain in a vertical plane, the upper reach of which occupies the top channel and the lower reach of which occupies the lower channel, and mechanism for driving said chain.

4. The combination of a highway vehicle, a pair of spaced guides thereon for a demountable body, a propelling chain on the vehicle parallel to the guides, a box at the rear end of the vehicle, a propelling mechanism mounted in said box for driving the chain, and a pair of bridges carried by said box in registration with the guides.

5. A vehicle having in combination, a pair of parallel guides adapted to support a demountable container, a chain parallel with said guides, a motor and a reducing gearing respectively on opposite sides of the chain, the armature shaft of the motor being connected with the reducing gearing across the vertical plane of the chain, a driving sprocket for the chain, a pair of gears on opposite sides of the sprocket and connected therewith, and gearing connecting said pair of gears to the reducing gearing.

6. The combination of a highway truck, a pair of longitudinal guideways thereon for a demountable container, a longitudinal endles chain between the guideways, a box at the rear end of the vehicle divided into compartments, a motor in one compartment, reducing gearing in another compartment, a connection from the motor to the reducing gearing, and a connection from the reducing gearing to the chain.

7. The combination of a highway vehicle having a pair of parallel guides for a demountable body, and an endless propelling chain located centrally of the vehicle between said guides, a rear sprocket wheel for driving the chain, a pair of compartments at the rear of the vehicle respectively on opposite sides of the sprocket, a motor in one of the compartments, reduction gearing in the other compartment, the motor being coupled with the reduction gearing and the reduction gearing coupled with the rear sprocket, and hinged covers for the two compartments.

8. The combination of a highway vehicle having a pair of parallel guides for a demountable body, and an endless propelling chain located centrally of the vehicle between said guides, front and rear sprockets for the chain, a pair of compartments at the rear of the vehicle respectively on opposite sides of the rear sprocket, a motor in one of the compartments, a reduction gearing in the other compartment, the motor being coupled with the reduction gearing and the reduction gearing coupled with the rear sprocket and a water shed between the compartments beneath the rear sprocket.

9. The combination of a highway vehicle having guides for a demountable body, a propelling mechanism for the body extending parallel to the guides, a box carried by the vehicle and provided with ends and a pair of intermediate partitions, a pair of bridges each located between one of said ends and the adjacent partition and pivotally supported thereby and adapted to register with the corresponding guide, and a motor and gearing carried by the box between said partitions and adapted to drive the propelling mechanism.

10. A highway vehicle having parallel guides for supporting a demountable body, and a propelling chain between the guides, a box in the form of an upwardly facing trough adjacent the ends of the guides, said trough having a front plate secured to the vehicle, a bottom plate and an edge flange carried by the vehicle, and driving mechanism for the chain removably carried by said box between its front plate and edge flange.

11. The combination of a highway vehicle having parallel guides for a demountable body extending lengthwise of the vehicle, a box at the rear end of the vehicle, a pair of bridges pivotally supported by pins carried by the box in front of the rear end thereof, and bumpers beneath the bridges carried by the rear end of the box.

12. A platform suitable for mounting on a highway vehicle and having transverse bolsters, a pair of guides thereon, a centrally located longitudinal endless propelling chain between the guides, a depending box secured to the rearmost bolster, a driving sprocket for the chain carried by said box, a motor in the box on one side of the sprocket, reduction gearing in the box on the other side of the sprocket, a connection between the motor and reduction gearing, and a connection between the reduction gearing and sprocket.

13. A platform suitable for mounting on a highway vehicle, a pair of guides thereon, a centrally located longitudinal endless propelling chain between the guides, a depending box supported by the platform at its rear end, a driving sprocket for the chain carried by said box, a motor in the box on one side of the sprocket, reduction gearing in the box on the other side of the sprocket, a connection between the motor and reduction gearing and a connection between the reduction gear and sprocket, a pair of bridges pivotally carried by the box in registration with the guides, and a pair of bumpers carried by the box beneath the bridges and adapted to support and protect them.

14. The combination of a highway truck having a chassis frame and cab with a rearwardly open pocket extending beneath the cab seat, and a platform mounted on the chassis and having a peaked front end extending into the pocket, fixed guides on the platform terminating short of the cab and adapted to support a demountable body, and a central propelling chain carried by the platform and extending parallel with the guides, passing around sprockets at the rear and front ends of the platform, and mechanism for operating the chain.

15. In a freight transporting apparatus, the combination of a vehicle, a platform thereon diverging rearwardly from its front central region, a propelling chain extending from the front along the longitudinal center of the platform, a substantially horizontal push-and-pull bar adapted to be connected at its forward end to the chain and at its rear end to a demountable container, guides for the container on opposite sides of the chain, and mechanism for operating the chain.

16. The combination of a highway vehicle, a supplemental platform, means for removably attaching it to the vehicle, a transverse member secured to the rear end of the platform and having a supporting portion on a lower level than the platform, a motor and gear reducing mechanism on said supporting portion, and a looped propelling chain mounted on the platform and operated by the motor and gear mechanism.

17. In a freight transferring apparatus, the combination of a vehicle platform having a peaked front end, laterally spaced guides on the platform terminating short of the front end thereof, a propelling mechanism on the platform at the central axis thereof, and a rearwardly extending push-and-pull bar adapted to be connected at its forward end to the propelling mechanism and at its rear end to a demountable container on the guides.

18. In a freight transferring apparatus, the combination of a vehicle with a platform thereon having a rounded front end, laterally spaced guide channels on the platform, a sprocket wheel at the center of the rounded front end, a sprocket wheel at the rear of the platform, an endless propelling chain in a vertical plane extending over such said sprocket wheels, and means carried by the platform behind the rear end of the platform and below the top plane thereof for driving the rear sprocket wheel.

19. The combination of a vehicle with transverse bolsters carried thereby, a central endless propelling chain in a vertical plane, with the upper reach above the bolsters, upwardly facing guide channels mounted on the bolsters on opposite sides of said chain for supporting a demountable body, pivoted bridges registering with the ends of the guide channels, and adapted to be connected at their free ends to a railway car or platform, means for connecting a demountable body to said chain, and means between the bridges for operating said chain.

20. The combination of a vehicle, a platform thereon, having a centrally peaked front end and a straight rear end, a central sprocket wheel at the front end, a central sprocket wheel at the rear end, an endless propelling chain in a vertical plane looped over the sprocket wheels, mechanism supported by the platform at its rear end for driving the real sprocket wheel, fixed longitudinal guides on opposite sides of said chain, and bridges pivotally carried on opposite sides of said driving mechanism and spaced in correspondence with the guides.

21. The combination of a removable platform adapted for mounting on a vehicle, an endless propelling chain carried thereby in a vertical plane centrally located and extending lengthwise of the platform, a box carried at the rear end of the platform, propelling mechanism in said box connected with said chain, and longitudinal guides on the platform on opposite sides of the chain.

22. In a freight transferring apparatus, the combination of a vehicle platform having a peaked front end, laterally spaced guides on the platform terminating short of the front end thereof, an endless propelling chain on the platform at the central axis thereof, and a rearwardly extending push-and-pull bar of a length commensurate to the fore-and-aft distance from the front of the guides to the front of the chain, said bar being adapted to be connected at its forward end to the chain and at its rear end to a demountable container on the guides.

23. In a freight transporting apparatus, the combination of a vehicle, a demountable container adapted to rest thereon, the vehicle diverging rearwardly from its front central region beyond the container, a propelling chain extending from the front along the longitudinal center of the vehicle, a push-and-pull bar adapted to be connected substantially horizontally at its forward end to the chain and at its rear end to the demountable container, while the latter is entirely on the vehicle, and mechanism on the vehicle for operating the chain.

24. In a freight transferring apparatus, the combination of a vehicle with a platform thereon having a peaked front end, laterally spaced guide channels on the platform shorter than the central length of the platform, a sprocket wheel at the center of said peaked front end, an endless propelling chain engaging said sprocket wheel and extending rearward centrally of the platform, and a push-and-pull bar connected at its forward end to said chain and extending rearwardly substantially horizontally and connected to a container above said guide channels.

25. A platform adapted for mounting interchangeably upon a truck or trailer, and having a peaked front end and longitudinal guides respectively on opposite sides of the longitudinal center of the platform, and a central propelling mechanism leading from the front end of the platform rearwardly, and available for attachment in front of the demountable body on the guides.

26. A platform adapted for mounting interchangeably on a semi-trailer or highway truck, having a rounded front end, straight rear end, a central propelling chain leading from the front end to the rear end, longitudinal guides respectively on opposite sides of the chain terminating further back than the front end of the chain, a propelling mechanism at the straight rear end of the platform connected with the chain, and bridges pivotally carried at the rear end on opposite sides of the propelling mechanism and spaced to register with the longitudinal guides.

27. A supplemental platform for mounting on a highway vehicle, comprising transverse bolsters, longitudinal stringers on their undersides, adapted to register with the chassis sills of the vehicle, longitudinal guide channels on the tops of the bolsters, lateral cantilever bars carried by the bolsters extending outwardly, top side plates supported by the bars extending substantially from the guide channels to the outer ends of the bars to form gussets bracing the platform, and longitudinal propelling mechanism carried by the bolsters between the guide channels.

28. A supplemental platform for mounting on a highway vehicle, comprising transverse bolsters, longitudinal stringers on their undersides, longitudinal guides in the form of upwardly facing channel beams on the tops of the bolsters, lateral cantilever bars carried by the bolsters extending outwardly, top side plates supported by the bars and flanged upwardly at their inner edges where they abut the outer flanges of the channel beams, and longitudinal propelling mechanism carried by the bolsters between the guide channels.

29. A supplemental platform for mounting on a highway vehicle, comprising transverse bolsters, longitudinal stringers on their undersides, longitudinal guide channels on the tops of the bolsters, lateral cantilever bars carried by the bolsters extending outwardly, top side plates supported by the bars and having downward flanges at their outer ends extending across the ends of the bars.

30. In a transportation system, the combination of a coupled tractor and trailer with a supplemental platform mounted on the trailer and having a centrally peaked front end, a pair of longitudinal guides on the platform respectively adjacent the side edges thereof and terminating rearward of the platform front, a centrally located endless propelling chain carried by the platform and leading from its forward end, and a driving mechanism for the chain.

31. The combination of a highway vehicle, having longitudinal guides adjacent its side edges, a container adapted to be carried thereby, and having a length commensurate with the length of the guides, the vehicle adjacent the side edges terminating substantially at the forward ends of the guides, while in the central region it extends materially farther forward, whereby, when the container is on the vehicle with the rear wall of the container substantially flush with the rear end of the vehicle, the central front end of the vehicle will be in a region well in advance of the front wall of the container, a longitudinal centrally-located propelling chain on the vehicle extending rearwardly from substantially the front end thereof, and a rearwardly extending push-and-pull bar connecting the chain with the front of the container.

BENJAMIN F. FITCH.